United States Patent
Miyoshi

(10) Patent No.: US 8,547,942 B2
(45) Date of Patent: Oct. 1, 2013

(54) TRANSMITTER STATION WITH DETECTABLE FUNCTION FOR RADIO CONDITION

(75) Inventor: Hidekazu Miyoshi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 738 days.

(21) Appl. No.: 12/580,547

(22) Filed: Oct. 16, 2009

(65) Prior Publication Data

US 2010/0128705 A1    May 27, 2010

Related U.S. Application Data

(60) Provisional application No. 61/106,252, filed on Oct. 17, 2008.

(51) Int. Cl.
| | |
|---|---|
| *H04W 4/00* | (2009.01) |
| *H04J 3/16* | (2006.01) |
| *H04B 7/212* | (2006.01) |
| *G06F 15/16* | (2006.01) |
| *H04W 24/00* | (2009.01) |

(52) U.S. Cl.
USPC ........... 370/338; 370/469; 370/328; 370/347; 370/331; 709/231; 709/232; 709/236; 455/424; 455/425

(58) Field of Classification Search
USPC ........................................................ 370/338
See application file for complete search history.

(56) References Cited

U.S. PATENT DOCUMENTS

| | | | |
|---|---|---|---|
| 2003/0179708 A1 | 9/2003 | Kamerman et al. | |
| 2004/0086058 A1* | 5/2004 | Eckhardt et al. | 375/295 |
| 2006/0034233 A1* | 2/2006 | Strutt et al. | 370/338 |
| 2006/0251042 A1 | 11/2006 | Mikami | |

FOREIGN PATENT DOCUMENTS

| | | | |
|---|---|---|---|
| JP | 2004-007504 A | 1/2004 |
| JP | 2006-109448 A | 4/2006 |
| JP | 2006-279253 A | 10/2006 |
| JP | 2007-166373 A | 6/2007 |
| JP | 2008-042922 A | 2/2008 |

* cited by examiner

*Primary Examiner* — Noel Beharry
(74) *Attorney, Agent, or Firm* — Venable LLP; Michael A. Sartori; Tamatane J. Aga

(57) ABSTRACT

In a wireless LAN system, the transaction efficiency may be enhanced. The transmitter station holds the number of transaction successes, the number of transaction failures, the data rate when the transaction is carried out, and the number wait to perform the transaction. The transmitter station determines that the radio wave condition is in the state {WS} from the data rate at which the transaction succeeded; the area covered by the transmitter station is influenced by the hidden terminal by the average rate of the failure transaction, and the area is influenced by the collision terminal from the relation between the number of the wait for the transaction and the data rate. The transmitter station selects an optimum mode for respective conditions.

7 Claims, 4 Drawing Sheets

US 8,547,942 B2

TRANSMITTER STATION WITH DETECTABLE FUNCTION FOR RADIO CONDITION

CROSS REFERENCE TO ELATED APPLICATIONS

This application claims the benefit of U.S. Provisional patent application Ser. No. 61/106,252 filed Oct. 17, 2008, incorporated herein by reference.

BACKGROUND OF THE INVENTION

1. Field of the Invention

The present invention relates to a method, by detecting a radio wave condition of the wireless LAN system ruled by standard of IEEE 802.11, to provide an optimum performance to a station under such condition.

2. Related Prior Art

Recently, one system becomes popular to construct a network through radio frequencies, which is typically represented by the wireless LAN system. This system uses license-free bands without official approvals, for instance, 2.4 GHz band for the 802.11b and 802.11g, while, 5 GHz band for 802.11a. Even the system uses those license-free bands, when each of stations freely begins its transmission, the data to be transmitted would be congested and the reliable communication would not be realized. Accordingly, the standard 802.11 rules simple management protocols below described.

That is, in the contention-based mode, the station with data to be transmitted, that is, the station to begin the transmission of the data first senses the carriers for a preset period, which is called as Distributed Inter Frame Space (hereafter denoted as DIFS) and is only capable of transmitting packets when the station does not sense the carriers, which means that channels are idle within a restricted area. When the station detects the carrier, which means that another transmitter station already occupies the carrier to communicate with another receiver station, the transmitter station senses the carriers again for another DIFS period after an idle time interval. Verifying a condition where the channels are vacant, setting the counter with a count created by the table of random numbers and down-counting the counter, the transmitter station may begin to transmit after the counter is reset. Deferred transmitter stations each sets the digit in respective down counter different from each other; accordingly, the next transmitter station may be randomly selected, which may avoid a situation where a specific transmitter station may transmit data, or always enters the waiting mode.

While, the receiver station communicating with the transmitter station returns, to the transmitter station after receiving the whole transmission data, an ACK when the whole data are correctively receiver but an NCK when an irregular reception is detected. When the NCK is replied, the transmitter station transmits the data again by reducing a modulation rate, the transmission speed, in a next acquired frame. One transaction terminates by the reply of the ACK/NCK, and another transmitter station, the same transmitter station may be assigned again depending on a random number set in transmitter station or a number of transmitter station that waits for the transaction, begins the next transaction after the period of DIFS. Thus, the 802.11 standard adopts a protocol called as the Collision Avoidance (CA) CSMA/CA that does not ensure the avoidance of the collision, where a plurality of transmitter stations begins the transaction at a time, but reduces the possibility of the collision.

However, the CSMA/CA protocol mentioned above, because it is a passive protocol dynamically between the transmitter station and the receiver station, various factors to degrade the transaction in an area covering the transmitter and receiver stations are occurred, which influences the radio wave condition between the stations and reduces the transaction efficiency. Typical factors are (1) a physical medium to affect the electromagnetic interference is placed between the transmitter station and the receiver station, (2) a plurality of transmitter stations locates within the area, and (3) the area is exposed to the radio wave output from the other transmitter station. The case (2) above is generally called as the "collision terminal" or "exposed terminal", while the case (3) is often called as the "hidden terminal".

The Japanese patent application published as JP-2007-166373A has disclosed a method to solve the subject "collision terminal", while, a handshake protocol using RTS/CTS signal, which is optionally provided by the 802.11 standard, is known as a solution for the "hidden terminal" of the case (3) above.

The Japanese patent, JP-2004-007504A, has disclosed a method to establish the transaction, when one transmitter station is newly assigned in an area covered by a specific transmitter station, between two transmitter stations. Another Japanese patent application published as JP-2006-279253A has disclosed a method to avoid a data collision when the transmitter stations different from each other and having respective specific areas carries out the transaction with the same carrier frequency in an area overlapped with respective areas. Another Japanese patent published as JP-2008-042922 has disclosed a method to avoid remarkable degradation of the transaction throughput when the hidden terminal exits.

For the transmitter station and the receiver station, a transaction between which is influenced by the factors mentioned above, it is important to detect which is the current radio wave condition. The current radio wave condition for the transmitter station is not always difference same as that for the receiver station, while, the transmitter station is hard to know the radio wave condition of the receiver station. Adjusting the transaction mode, for instance, the output power of the radio wave and the data rate, depending on the current radio wave condition, it would be possible to perfume the transaction in a condition optimum to the current radio wave condition. It would be possible that the receiver station notifies the current radio wave condition to the transmitter station by the handshake mode, but wireless apparatuses widely used now generally do not implement such a protocol.

Moreover, the protocol mentioned above is premised that the transaction is carried out under a worse radio wave condition in the first place; the transaction of the information itself depends of the radio wave condition, which is hard to be acknowledged as a reliable method. Moreover, in an apartment house, multiple radio waves are congested from apparatus owned by different persons, which easily introduces the interference. The monitoring of the radio wave condition by an instrument such as spectrum analyzer is hard because the instrument itself is so expensive; and the transmitter station or the receiver station implements such a function would be inconsistent with the simplicity that the 802.11 standard aims.

Therefore, the present invention provides a method to estimate the current radio wave condition without appending another transmitter station or receiver station, and a configuration of the stations that implements the method.

SUMMARY OF THE INVENTION

The transmitter station according to the present invention, which performs a transaction to a receiver station by a variable data rate depending on the current radio wave condition, holds the information the data rate, the number of successes for the transaction at the data rate, the number of failures for the transaction at the data rate, and the number of waits for the transaction. The transmitter station detects the current radio wave condition based on the past record of the information, and has a feature to adjust the data rate for the transaction, the output power, the data size for one transaction, and the sensitivity to detect the carrier.

The transmitter station, first determines whether a radio wave impediment is exist or not between the transmitter station and the receiver station by comparing a current index obtained by an equation; $0.9 \times Rsh + 0.1 \times Rsl$, where Rsh is a rate of transaction success at a faster data rate and Rsl is a rate of transaction success at a slower data rate, with a first reference. When some radio wave impediment exist, the transmitter further estimates whether the target receiver station is influenced by another transmitter station located out of the target area or not by comparing another current index calculated by an equation of;

$$0.5 \times |Rlm-Rlh| + 0.5 \times |Rlm-Rll|,$$

where Rlm is an average rate of the transaction fail, Rlh is a rate of the transaction fail at a faster data rate, and Rll is a rate of the transaction fail at a slower data rate. Moreover, the transmitter station determines that another transmitter station exists within the target area when the rate of the transaction wait exceeds the third reference when the target receiver station is influenced from the other transmitter station, while, the rate of the transaction wait exceeds the fourth reference, which is small than the third reference, when the target receiver station is free from the other transmitter station.

The transmitter station according to the present invention, based on the current radio wave condition estimated the protocol mentioned above, may suitably adjust the output power of the transaction, the carrier sensitivity, the length of the data transmitted in one transaction, which is called as the packet size; the transaction efficiency may be enhanced. Moreover, the transmitter station may solely implement the function to estimate the radio wave condition without arranging the receiver station so as to follow the function in the transmitter station; the wireless communication system may be easily and inexpensively implemented. Further, the transmitter station enhances the output power thereof only when the transmitter station estimates that some impediment medium exist, redundant interference affected to apparatuses around the target transmitter station and to the radio wave condition may be reduced.

Further, the transmitter station may enhance or reduce the receiving sensitivity only when a hidden terminal exists. Based on the detection, the transmitter station may reduce the data size transmitted in one transaction only when it is necessary. Depending on the radio wave condition, the adjustment of the receiving sensitivity often results in the degradation of the performance; however, the transmitter station of the present invention may adjust the sensitivity based on the detection of the radio wave condition, which does not reduce the performance of the transmitter station.

BRIEF DESCRIPTION OF THE DRAWINGS

The foregoing and other purposes, aspects and advantages will be better understood from the following detailed description of a preferred embodiment of the invention with reference to the drawings, in which:

FIG. 1A shows a state {WS} where the radio wave signal is weakened by some physical barriers, FIG. 1B shows a state {CS} where some transmitter stations that wait for transmitting data within an area, and FIG. 1C show a state {HT} where an area has a receiver station that communicates with another transmitter station (hidden terminal);

DETAILED DESCRIPTION OF PREFERRED EMBODIMENTS

Next, preferred embodiments according to the present invention will be described as referring to accompanying drawings. In the description of the drawings, the same element will be referred by the same numeral without overlapping explanations. Besides, in the description presented hereinbelow, the transmitter station will be depicted as an access point {AP}, while the receiver station will be depicted as (STA); however, the present invention is not restricted to those combinations. The present invention may be widely applicable to the radio communication with functions of the transmission and the reception following the 802.11 standard.

Figure 1A:
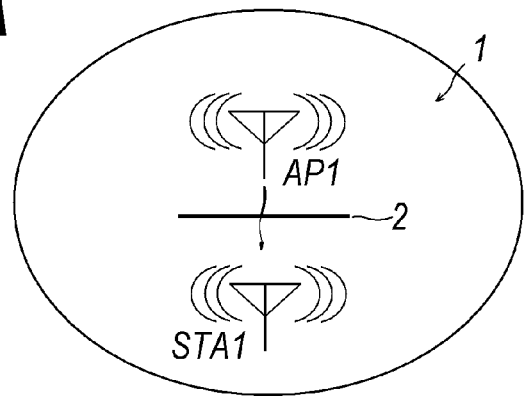
FIGS. 1A to 1C show various impeding factors for the radio wave conditions; that is.

First, impeding factors for the communication between the transmitter station and the receiver station will be described in detail as referring to the drawings. FIG. 1A shows a state where some substances that shield the radio wave physically exist between the transmitter station and the receiver station. Under this condition, the intensity of the radio wave arriving to the receiver station is weakened; accordingly, the transaction between the stations will be resumed by lowering the data rate step-by-step. Consequently, even the communication become successful, the equivalent throughput performance is reduced.

Figure 1B:
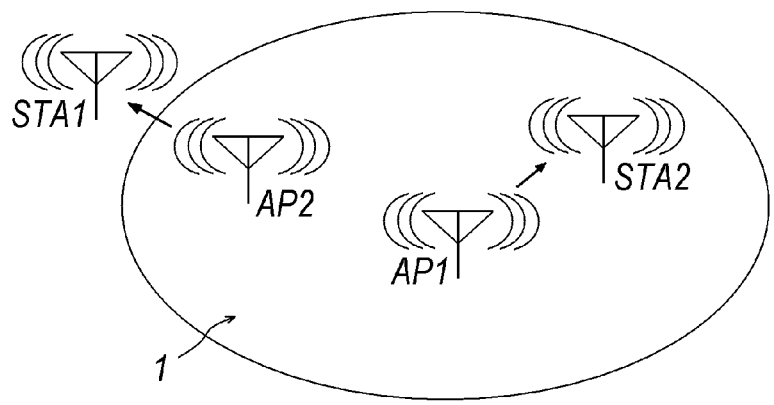

FIG. 1B shows the condition where the area covered by one AP has many transmitter stations that wait for the transaction. Even when receiver stations to communicate with the transmitter stations locate out of the area, less time to occupy the carrier may be assigned for one transmitter station, which means that the established transaction number decreases, consequently, the equivalent throughput performance reduces.

Figure 1C:
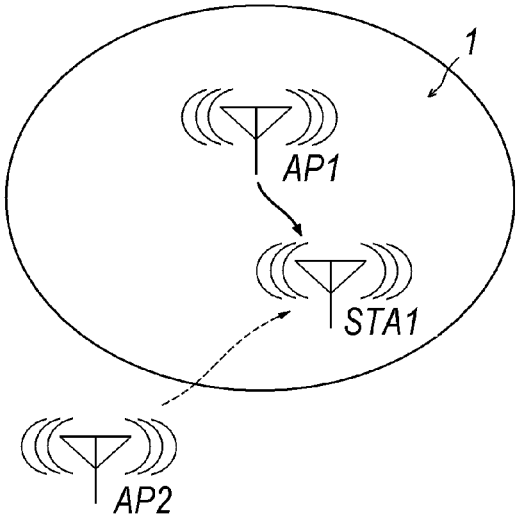

A condition is illustrated in FIG. 1C, in which one transmitter is to establish the transaction with a receiver station, but this receiver station is communicating with another transmitter station that locates out of the area where the transmitter station is unable to communicate with, which is called as the hidden terminal; accordingly, the transaction between the target transmitter station and the target receiver station is restricted. Types of the hidden terminal are, for instance, another transmitter station that follows the 802.11 standard or some radio waves generated by electric equipments such as microwave oven set in a house.

The transaction according to the 802.11 standard, because of its junk band operation, is substantially uncontrolled. A system in which a managing station is installed and solves factors mentioned above under the control by the managing station would be unfit the 802.11 standard. Judging by each station and optimizing the transmission parameters based of the judgment, the degradation of the transaction may be prevented.

The 802.11 standard adopts the handshake protocol for each packet in the transaction between respective transmitter station and receiver stations. A packet is often called as a frame or a transaction, the description below presented uses a term "packet" for the explanation sake. After establishing the transaction link from the transmitter station to a particular receiver station, the receiver station replies the ACK when the transmitted packet is normally received, while, the NCK when the packet is irregularly received. Also, the transaction not only from the transmitter station to the receiver station, but the regular/irregular status may be assumed for the transaction from the receiver station to the transmitter station. Accordingly, the transmitter station judges the transaction was unsuccessfully ended when neither of the ACK not the NCK is replied. Thus, the transmitter station monitors in every packets whether the transaction was regularly or irregularly completed. The method according to the present invention further provides an event that the AP stores the data rate of the transaction.

Figure 2:
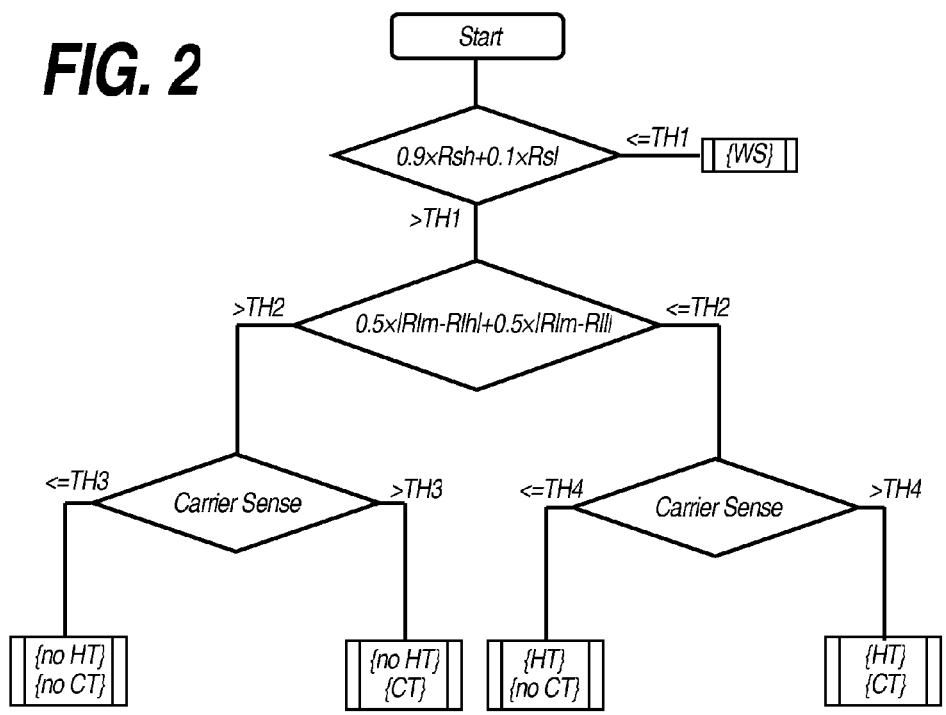
FIG. 2 shows a flow chart to decide whether the radio wave condition is in {WS}, {CT} or {HT}.

Next, a method to determine the radio wave condition mentioned above will be described as referring to a flow chart of FIG. 2. First, the condition shown in FIG. 1A is described where the data rate is necessary to be lowered because of the less sensitivity in the receiver station due to the shielding medium between the transmitter and receiver stations, which is hereafter denoted as {WS: Weak Signal}.

For {WS}, comparing a current index calculated based on the equation below with the first threshold (TH1):

$$\text{Current Index} = 0.9 \times Rsh + 0.1 \times Rsl \qquad (1),$$

where Rsh is a probability of the transmission success in a high data rate (<=1.0), while, Rsl is the probability of the transmission success in a slow data rate (<=1.0).

Then, assuming the first threshold TH1 as 0.1, the current radio wave condition is regarded to be in the {WS} state when the current index defined above is less than the first threshold because the probability of the transmission success for the transaction is always in a lesser condition. On the other hand, when the current index above exceeds the first threshold, the radio wave condition is determined in other situations. The transmitter station generally tries, when the intensity received by the receiver station is weakened, another transaction by reducing the data rate gradually.

The faster data rate may be 54 Mbps followed in the 802.11 standard, while, the slower data rate may be 9 Mbps. Falling down the data rate gradually due to a poor radio wave condition, which is reflected in a condition Rsh<<Rsl in the equation above, the current index is lowered.

A table below listed shows a simulation result:

TABLE 1

| Success/fail counts under {WS} condition | | | | |
|---|---|---|---|---|
| | Success | | Fail | |
| Data rate | 54 Mbps | 9 Mbps | 54 Mbps | 9 Mbps |
| counts | 0 | 1052 | 0 | 123 |

The result shown in table 1 indicates that, whether the transaction succeeds or fails, the transaction is necessary to be lowered in the data rate thereof to 9 Mbps. The current index described above becomes:

$$\text{Index} = 0.9 \times (0/1175) + 0.1 \times (1052/1175)$$
$$= 0.0895$$

(2) Next, we consider a situation that, although the radio wave condition is not in the {WS} state, that is, the current index is greater than the first threshold (0.1), the equivalent transmission speed of the communication link between the transmitter station and the receiver station degrades because it is affected by the radio wave condition. This may be divided into two conditions; (2-1) a first condition is that the transaction packet assigned to the target transmitter station has to be relatively diminished by the existence of many transmitter stations that are waiting for the transaction within a area defined by the target transmitter station, which is hereafter called as {CT: Collision Terminal}; and (2-2) a target receiver station, to which the target transmitter station is going to communicate, or is communicating, is restricted in the communication due to the influence from another transmitter station which is undetectable from the target transmitter station, which is hereafter called as {HT: Hidden Terminal}.

An algorithm described below, which compares the current index with a second threshold (Th$_2$) may distinguish the state {CT} from the other state {HT}:

$$\text{Current Index} = 0.5 \times |R_{lm} - R_{lh}| + 0.5 \times |R_{lm} - R_{ll}| \qquad (2)$$

In equation (2), $R_{lm}$ is an average failure rate of the transaction (<=1.0). $R_{lh}$ is an average failure rate of the transaction at a relative faster data rate (<=1.0), and $R_{ll}$ is an average failure rate of the transaction at a relatively slower data rate (<=1.0), respectively.

Evaluating the current index above defined under an assumption that the second reference Th$_2$ is 0.5, the current index exceeding 0.5 corresponds to a case where the failure rate strongly depends on the data rate; while, the current index less than 0.5 reflects a case where the failure rate is nearly independent on the data rate.

Next, a transmission condition will be specified in further detail. The case {CT} decreases a time able to transact the communication assigned to the target transmitter station because the area has many transmitter stations that are waiting for the next transaction. However, because any barriers to impede the communication between the transmitter station and the receiver station, it is unnecessary to lower the data rate itself. Accordingly, because the transaction is not carried out in a slower data rate, only the failure rate $R_{lh}$ at a relatively faster rate increases.

On the other hand for the condition because the radio wave condition at the target receiver station is degraded, the transaction between the target transmitter station and the target receiver station has to lower the data rate to establish the communication link therebetween. That is, in equation (2) above described, because the probability of the transmission failure is independent of the data rate, the current index becomes less than the second threshold Th$_2$=0.5. Table 2 below presented show a simulation results of the transaction under the condition {HT}. Table 2 also illustrates the number of BUSY, the number of wait for the transaction.

TABLE 2

| Success/fail counts under {HT} condition | | | | |
| --- | --- | --- | --- | --- |
| | Success | | Fail | | Wait |
| Data rate | 54 Mbps | 9 Mbps | 54 Mbps | 9 Mbps | — |
| counts | 593 | 480 | 324 | 280 | 7 |

In this case, the current index in equation (2) becomes:

$$\text{Current Index} = 0.5 \times |0.356 - 0.353| + 0.5 \times |0.356 - 0.368|$$

$$= 0.0135 < 0.5$$

That is, the evaluation of equation (2) above may detect that at least the radio wave condition is in the state {HT}. A subject to be decided next is whether the radio wave condition is in the state {CT} concurrently with the state {HT} or in the state {CT} exclusively. The present invention may distinguish the above conditions as follows.

(3) The target transmitter station may count the number until it is assigned to be transmittable, equivalently, the number of a wait for the transmission. The method of the invention may evaluate the number of the waiting for deciding the radio wave condition is in the state {CT} or not. It is necessary to take the existence of the duplication of the state {HT} into consideration. That is, when the condition is in the state {HT}, the data rate has to be doubly lowered because the receiver stations in the state {CT} are affected by the hidden terminal in addition to the target receiver station is also affected by the hidden terminal.

The method according to the invention may distinguish two states mentioned above by setting two additional thresholds, the third threshold $Th_3$ and the fourth threshold $Th_4$. The third threshold $Th_3$ is set to be 0.1 when the step (2) above explained decides the condition is not in the state {HT}, and the current condition is in the state {CT} when the waiting ratio exceeds this third threshold $Th_3$, while, the current condition is not in the state {CT} and also not in the state {HT} when the waiting ratio is less than the third threshold $Th_3$.

On the other hand, when the second step decides the current condition is in the state {HT}, the method sets the fourth threshold to be equal to 0.5. Further, when the waiting ratio is less than the fourth threshold, the current condition is in the state {HT} but not in the state [CT]; while, when the waiting ratio exceeds the fourth threshold, the current condition is in the {HT} and also in the {CT}. Thus, the method of the invention may distinguish the current radio wave condition is in the state {WS} or in the congested state of {HT} and {CT}.

Figure 3:
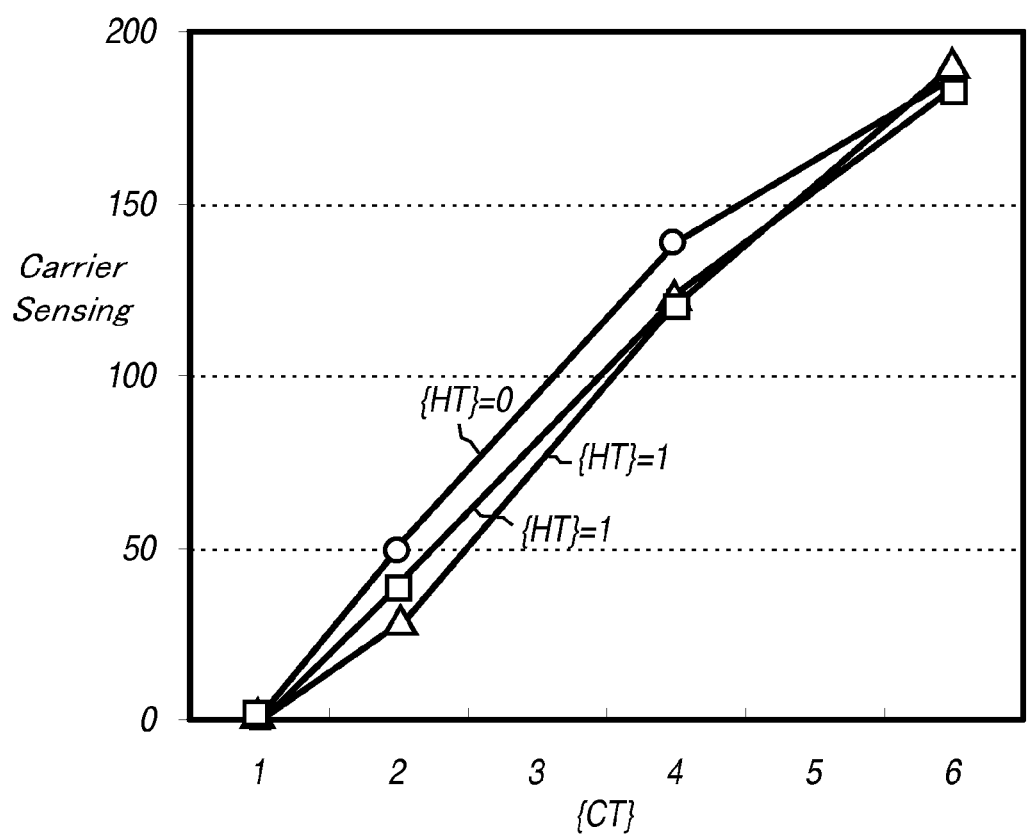
FIG. 3 shows a relation of the state {CS} to the number of times to wait the transaction.

FIG. 3 shows a simulation result to evaluate the method to detect the radio wave condition according to the present invention, where some parameters are assumed. FIG. 3 illustrates the number of the waiting for the transmission against the states {CT] and {HT}. The number of the waiting depends on both the collision terminal and the hidden terminal. Increasing the hidden terminal from 0 to 2, the number of waiting increases 75% for a case of two collision terminals and 14% for another case of four collision terminals, but decreases by 3% for a case of six collision terminals. This means that, when many collision terminals exist in the area, the existence of the hidden terminal gives no longer ineffective for the radio wave condition, only the collision terminals may determine the condition.

Figure 4:
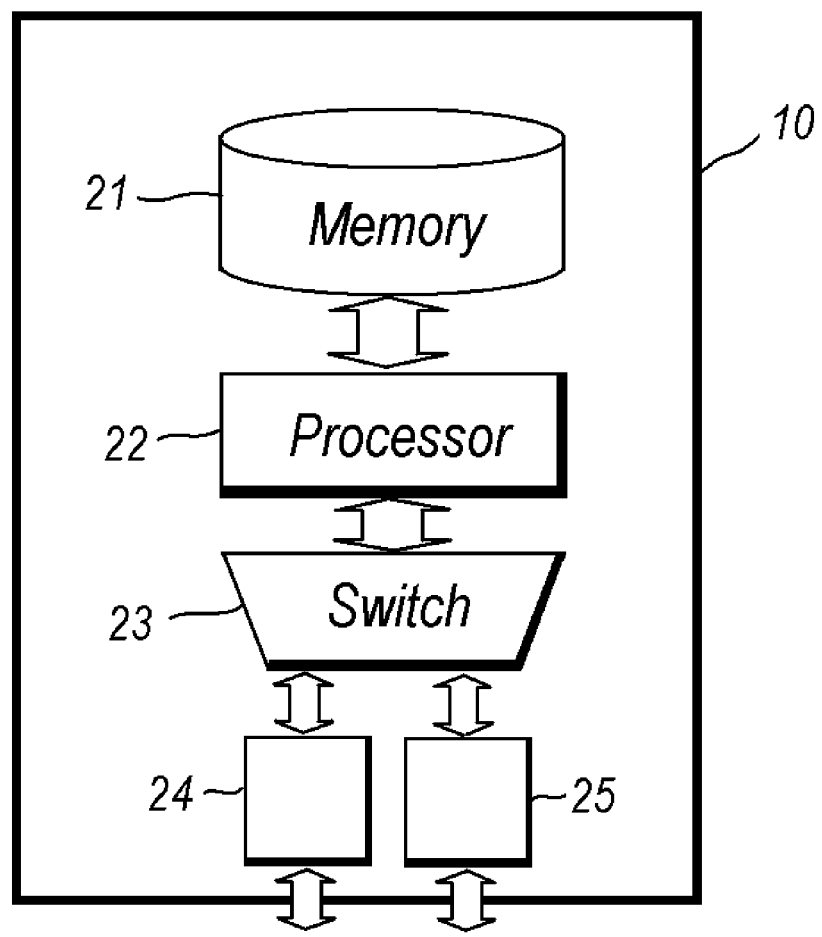
FIG. 4 shows architecture of the transmitter station according to the present invention.

FIG. 4 is an example of a block diagram where the access point (AP) as a transmitter station provides the function to detect the radio wave condition according to the present invention. The AP provides, as the interface for the input and the output, an I/F-IC for the wired communication and another I/F-IC for the wireless communication. These two I/Fs are connected with a switch and relay packets received by one of the I/F-ICs to the other I/F-ICs. Further, the AP equips a memory as a controlling block to store an algorithm to detect the radio wave condition, the number of the waiting, the data rate when the transaction is succeeded, and so on. Fetching the algorithm by the processor and executing it, the current radio wave condition may be detected.

The, when the radio wave condition is detected to be in the state {WS}, the communication link with the receiver station may be established as keeping the data rate in a faster speed by instructing the I/F-IC for the wireless communication so as to increase the output power of the radio wave. When the current condition is in the state {HT}, the I/F-IC for the wireless communication is illustrated so as to increase the sensitivity thereof to enhance the carrier detection capability. This makes the hidden terminal for the target transmitter station detectable, which may relieve the interference in the target receiver station. Or, the size of the packet to be transmitted by one transaction may be shortened, the shortening the packet size, which may also relive the interference in the target receiver station.

Also, setting the RTS/CTS (Request To Sent/Clear To Sent) function with respect to the receiver station, which is specified in the 802.11 standard, the influence of the hidden terminal may be released. However, because the RTS/CTS function sometimes enlarges the area to sense the carrier unlimitedly by chain links of the receiver stations, the RTS/CST function is necessary to be pained an attention in the operation thereof.

Moreover, when the current radio wave condition is in the state {CT}, the I/F-IC may be instructed so as to lower the sensitivity to receive the radio wave to narrower the carrier sensing area, which may decrease the number of the collision terminals. Or, setting the packet size to be transmitted at one transaction longer, which means that the transmitter station may set the mode thereof to send the data as long as possible once the transmitter channel is assigned, the influence of the collision terminals may be avoided.

The transmitter station may implement the detection algorithm and changes itself so as to follow the current radio wave condition. The algorithm according to the present invention may be implemented, not only the transmitter station, but in a receiver station to control the receiver station. For instance, when the current radio wave condition is in the state {WS}, the receiver may prevent the data rate from decreasing by increasing the receiver sensitivity.

Thus, the transmitter station of the present invention is described as referring to specific and exemplary embodiment. However, many modifications and changes will become apparent without departing from the broader spirit and scope of the present invention. The present specification and figures are accordingly to be regarded as illustrative rather than restrictive.

I claim:

1. A transmitter station for a wireless communication able to transmit data to a receiver station with a variable data rate depending on a current radio wave condition;

wherein said transmitter station holds a plurality of records including a current data rate, a number of successes at data rates, a number of failures at data rates and a number of waits to transmit data at data rates;

wherein said transmitter station compares a first threshold with a first weighted sum of a probability of transaction success at data rates faster than said current data rate and a probability of transaction success at data rates slower than said current data rate, and determines based on said comparison whether said current radio wave condition is weakened by a physical barrier or not;

wherein said weighted sum is:

$$0.9 \times R_{sh} + 0.1 \times R_{sl},$$

where $R_{sh}$ is said probability of transaction successes at data rates faster than said current data rate, and $R_{sl}$ is said probability of transaction successes at data rates slower than said current data rate; and wherein said transmitter station controls said current data rate, transmission power, a packet size of said transmitted data, and a receiving sensitivity based on said records.

2. The transmitter station of claim 1, wherein $R_{sh}$ is said probability of transaction successes at data rates of 54 Mbps, and $R_{sl}$ is said probability of transaction successes at data rates of 9 Mbps.

3. A transmitter station for a wireless communication able to transmit data to a receiver station with a variable data rate depending on a current radio wave condition;

wherein said transmitter station holds a plurality of records including a current data rate, a number of successes at data rates, a number of failures at data rates and a number of waits to transmit data at data rates;

wherein said transmitter station compares a first threshold with a first weighted sum of a probability of transaction success at data rates faster than said current data rate and a probability of transaction success at data rates slower than said current data rate, and determines based on said comparison whether said current radio wave condition is weakened by a physical barrier or not;

wherein said transmitter station further compares, when said first weighted sum exceeds said first threshold, a second threshold with a second weighted sum of a difference between an average probability of transaction failures at said current data rate and an average probability of transaction failures at data rates faster than said current data rate and a difference between said average probability of transaction failures at said current data rate and an average probability of transaction failures at data rates slower than said current data rate, and determines whether said receiver station communicates with another transmitter station or not; and wherein said transmitter station controls said current data rate, transmission power, a packet size of said transmitted data, and a receiving sensitivity based on said records.

4. The transmitter station of claim 3, wherein said second weighted sum is:

$$0.5 \times |R_{lm} - R_{lh}| + 0.5 \times |R_{lm} - R_{ll}|,$$

where $R_{lm}$ is said average probability of transaction failures at said current data rate, $R_{lh}$ is said average probability of transaction failures at said data rates faster than said current data rate, and $R_{ll}$ is said average probability of transaction failures at said data rates slower than said current data rate.

5. The transmitter station of claim 3, wherein said transmitter station further compares, when said receiver station does not communicate with said another transmitter station, a third threshold with a ratio of said number of said transaction waits at said current data rate to a sum of said number of said transaction successes at said current data rate, said number of said transaction failures at said current data rate and said number of said transaction waits at said current data rate, and determines whether said transmitter station collides with another transmitter station or not.

6. The transmitter station of claim 3, wherein said transmitter station further compares, when said receiver station communicates with said another transmitter station, a fourth threshold with a ratio of said number of said transaction waits at said current data rate to a sum of said number of said transaction successes at said current data rate, said number of said transaction failures at said current data rate and said number of said transaction waits at said current data rate, and determines whether said transmitter station collides with another transmitter station or not.

7. The transmitter station of claim 3, wherein said data rate faster than said current data rate is 54 Mbps, and said data rate slower than said current data rate is 9 Mbps.

* * * * *